(12) United States Patent
Sun et al.

(10) Patent No.: US 10,003,365 B2
(45) Date of Patent: *Jun. 19, 2018

(54) METHODS AND APPARATUS FOR MITIGATING KNOWN INTERFERENCE

(71) Applicant: Marvell World Trade Ltd., St. Michael (BB)

(72) Inventors: Yakun Sun, Sunnyvale, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/331,031

(22) Filed: Oct. 21, 2016

(65) Prior Publication Data

US 2017/0041030 A1 Feb. 9, 2017

Related U.S. Application Data

(63) Continuation of application No. 14/804,821, filed on Jul. 21, 2015, now Pat. No. 9,479,205, which is a
(Continued)

(51) Int. Cl.
*H04B 1/04* (2006.01)
*H04B 1/10* (2006.01)
(Continued)

(52) U.S. Cl.
CPC ............. *H04B 1/10* (2013.01); *H04J 11/0056* (2013.01); *H04L 5/0057* (2013.01);
(Continued)

(58) Field of Classification Search
CPC .... H04B 1/10; H04L 5/0057; H04W 56/0015; H04W 72/042
(Continued)

(56) References Cited

U.S. PATENT DOCUMENTS 6,141,393 A * 10/2000 Thomas ............... H04B 7/0851
375/347
6,463,105 B1 * 10/2002 Ramesh ................ H04B 7/005
370/342
(Continued)

FOREIGN PATENT DOCUMENTS

EP        1793507 A1    6/2007
WO    WO-2010099736 A1    9/2010

OTHER PUBLICATIONS

International Search Report and Written Opinion of International Searching Authority, International Application No. PCT/US2012/063557, dated Feb. 25, 2013.

*Primary Examiner* — Tan H Trinh

(57) ABSTRACT

Systems and methods for mitigating known interference at a receiving device are provided. A signal from a transmission source is received by a receiving device that is affected by an interference source. At least one of a first pilot signal associated with the transmission source and a second pilot signal associated with the interfering source is determined. The first pilot signal includes information broadcast from the transmission source and the second pilot signal includes information broadcast from the interference source. Interference caused by the interference source is mitigated from the received signal using at least one of the first pilot signal and the second pilot signal.

18 Claims, 2 Drawing Sheets

Related U.S. Application Data continuation of application No. 13/668,506, filed on Nov. 5, 2012, now Pat. No. 9,100,136.

(60) Provisional application No. 61/557,331, filed on Nov. 8, 2011.

(51) Int. Cl.

| | |
|---|---|
| *H04L 5/00* | (2006.01) |
| *H04W 72/04* | (2009.01) |
| *H04W 56/00* | (2009.01) |
| *H04J 11/00* | (2006.01) |
| *H04L 27/26* | (2006.01) |

(52) U.S. Cl.
CPC ...... *H04L 27/2613* (2013.01); *H04L 27/2647* (2013.01); *H04W 56/00* (2013.01); *H04W 56/0015* (2013.01); *H04W 72/042* (2013.01)

(58) Field of Classification Search
USPC ........ 455/501, 278.1, 63.1, 296, 562.1, 101, 455/69, 522, 67.13, 114.2, 278, 222; 375/350; 370/201, 208, 328, 334, 346, 370/316, 241, 329, 252
See application file for complete search history.

(56) References Cited

U.S. PATENT DOCUMENTS

| | | | | |
|---|---|---|---|---|
| 6,647,078 B1* | 11/2003 | Thomas | .............. | H04L 25/0204 375/285 |
| 7,496,164 B1* | 2/2009 | Mostafa | ............... | H04B 17/345 375/254 |
| 8,181,079 B2* | 5/2012 | Gorokhov | ............. | H04L 1/0002 714/748 |
| 8,411,805 B1* | 4/2013 | Lee | ....................... | H04W 24/02 375/316 |
| 8,755,756 B1* | 6/2014 | Zhang | .................... | H04B 1/109 455/114.2 |
| 8,855,040 B1 | 10/2014 | Gossett et al. | | |
| 8,996,066 B1* | 3/2015 | Lee | ....................... | H04W 16/28 370/334 |
| 9,100,860 B2* | 8/2015 | Jagger | .................. | H04B 1/1036 |
| 9,479,205 B2* | 10/2016 | Sun | ....................... | H04J 11/0056 |
| 2003/0128656 A1* | 7/2003 | Scarpa | ................. | H04L 25/0236 370/203 |
| 2005/0215218 A1* | 9/2005 | Bottomley | ............. | H04B 1/712 455/226.1 |
| 2006/0039454 A1 | 2/2006 | Cioffi | | |
| 2006/0064725 A1 | 3/2006 | Rabinowitz et al. | | |
| 2006/0133259 A1 | 6/2006 | Lin et al. | | |
| 2006/0159196 A1* | 7/2006 | Kwun | ................... | H04L 1/0048 375/267 |
| 2006/0269023 A1 | 11/2006 | Chimitt et al. | | |
| 2007/0025454 A1 | 2/2007 | Jones et al. | | |
| 2007/0042799 A1 | 2/2007 | Jubin et al. | | |
| 2007/0135042 A1* | 6/2007 | Shiff | ..................... | H01Q 1/2208 455/13.3 |
| 2007/0201588 A1* | 8/2007 | Loiseau | ................. | H04B 1/123 375/346 |
| 2007/0263744 A1* | 11/2007 | Mostafa | ................. | H04B 1/126 375/267 |
| 2008/0108363 A1 | 5/2008 | Yu et al. | | |
| 2008/0239936 A1 | 10/2008 | Doberstein | | |
| 2008/0240314 A1* | 10/2008 | Gaal | .................... | H04J 11/0056 375/346 |
| 2008/0248773 A1 | 10/2008 | De Carvalho et al. | | |
| 2009/0023404 A1 | 1/2009 | Leinonen et al. | | |
| 2009/0086864 A1 | 4/2009 | Komninakis et al. | | |
| 2009/0270028 A1* | 10/2009 | Khojastepour | ........ | H04B 7/155 455/24 |
| 2009/0296591 A1* | 12/2009 | Urabe | ............... | H04W 74/0808 370/252 |
| 2009/0310527 A1* | 12/2009 | Rao | ........................ | H04W 92/20 370/315 |
| 2009/0310724 A1 | 12/2009 | Shah et al. | | |
| 2010/0029262 A1 | 2/2010 | Wang et al. | | |
| 2010/0069010 A1 | 3/2010 | Karakayali et al. | | |
| 2010/0080323 A1 | 4/2010 | Mueck et al. | | |
| 2010/0103893 A1* | 4/2010 | Xia | ........................ | H04B 7/043 370/329 |
| 2010/0227562 A1 | 9/2010 | Shim et al. | | |
| 2010/0254325 A1* | 10/2010 | Narasimhan | ........... | H04B 7/024 370/329 |
| 2010/0303182 A1 | 12/2010 | Daneshrad et al. | | |
| 2011/0002371 A1* | 1/2011 | Forenza | ............... | H04B 7/0417 375/227 |
| 2011/0081864 A1 | 4/2011 | Srinivas et al. | | |
| 2011/0183692 A1 | 7/2011 | Lee et al. | | |
| 2011/0267937 A1* | 11/2011 | Yoo | ........................ | H04J 11/005 370/201 |
| 2011/0305303 A1* | 12/2011 | Sikri | ..................... | H04W 56/00 375/341 |
| 2012/0045995 A1* | 2/2012 | Nakano | ................ | H04J 11/0036 455/63.1 |
| 2012/0122472 A1* | 5/2012 | Krishnamurthy | ..... | H04L 5/0053 455/456.1 |
| 2012/0189083 A1* | 7/2012 | Reial | ...................... | H04B 1/123 375/340 |
| 2012/0224499 A1* | 9/2012 | Yoo | ........................ | H04J 11/005 370/252 |
| 2012/0250565 A1 | 10/2012 | Zhang et al. | | |
| 2013/0034175 A1 | 2/2013 | Kim et al. | | |
| 2013/0101060 A1* | 4/2013 | Cendrillon | ........... | H04B 7/0851 375/267 |
| 2013/0115988 A1 | 5/2013 | Sun et al. | | |
| 2013/0230013 A1 | 9/2013 | Seo et al. | | |
| 2014/0269248 A1 | 9/2014 | Abdelmonem et al. | | |
| 2014/0269374 A1 | 9/2014 | Abdelmonem et al. | | |
| 2014/0273861 A1 | 9/2014 | Abdelmonem et al. | | |
| 2015/0079918 A1* | 3/2015 | Kwon | .................... | H04B 15/02 455/296 |
| 2015/0092666 A1* | 4/2015 | Wu | ........................ | H04W 16/10 370/328 |
| 2015/0098440 A1* | 4/2015 | Yang | ................... | H04J 11/0056 370/330 |
| 2015/0208401 A1* | 7/2015 | Lu | ........................ | H04W 76/14 455/452.1 |
| 2015/0304876 A1 | 10/2015 | Abdelmonem et al. | | |
| 2015/0318945 A1 | 11/2015 | Abdelmonem et al. | | |
| 2015/0318964 A1 | 11/2015 | Abdelmonem et al. | | |
| 2015/0319625 A1 | 11/2015 | Abdelmonem et al. | | |
| 2015/0382225 A1 | 12/2015 | Jagger et al. | | |
| 2016/0050091 A1 | 2/2016 | Abdelmonem et al. | | |
| 2016/0050579 A1 | 2/2016 | Galeev et al. | | |
| 2016/0066225 A1* | 3/2016 | Zhu | .................... | H04W 36/0094 455/437 |
| 2016/0192362 A1 | 6/2016 | Galeev et al. | | |
| 2016/0249367 A1 | 8/2016 | Abdelmonem | | |
| 2016/0254840 A1 | 9/2016 | Abdelmonem et al. | | |
| 2016/0353455 A1 | 12/2016 | Jagger et al. | | |

\* cited by examiner

METHODS AND APPARATUS FOR MITIGATING KNOWN INTERFERENCE

CROSS REFERENCE TO RELATED APPLICATION

This application is a continuation of U.S. patent application Ser. No. 14/804,821, filed Jul. 21, 2015 (allowed) which is a continuation of U.S. patent application Ser. No. 13/668,506, filed Nov. 5, 2012, now U.S. Pat. No. 9,100,136, which claims the benefit under 35 U.S.C. § 119(e) of U.S. Provisional Application No. 61/557,331, filed Nov. 8, 2011, all of which are hereby incorporated herein by reference in their respective entireties.

FIELD OF USE

The present disclosure relates generally to interference mitigation systems and methods, and more particularly, to mitigating known interference.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, neither expressly nor impliedly admitted as prior art against the present disclosure.

In wireless communication systems, the signal received by a receiver from a transmission source (e.g., a base station) is typically affected by other transmission sources (e.g., other base stations or mobile devices). For example, in cellular networks, inter-cell interference is a type of interference that dominates over the noise level. Generally, traditional systems rely on channel estimates to be determined by the transmitting base stations in order to account for some interference at the receiving devices. However, such estimates may not accurately reflect the transmission channel and involve complex computations leading to inefficiencies.

SUMMARY OF THE INVENTION

In accordance with the principles of the present disclosure, methods and apparatus are provided for mitigating known interference in a received signal, and, more particularly, to mitigating interference using information broadcast from multiple transmission sources.

Systems and methods for mitigating known interference at a receiving device are provided. A signal from a transmission source is received by a receiving device that is affected by an interference source. At least one of a first pilot signal associated with the transmission source and a second pilot signal associated with the interfering source is determined. The first pilot signal includes information broadcast from the transmission source and the second pilot signal includes information broadcast from the interference source. Interference caused by the interference source is mitigated from the received signal using at least one of the first pilot signal and the second pilot signal.

BRIEF DESCRIPTION OF THE DRAWINGS

The details of one or more implementations are set forth in the accompanying drawings are the description below. Other features and various advantage will be more apparent upon consideration of the following detailed description, taken in conjunction with the accompanying drawings in which.

DETAILED DESCRIPTION

This disclosure generally relates to mitigating known interference in a received signal, and, more particularly, to mitigating interference using information broadcast from multiple transmission sources. For illustrative purposes, this disclosure is described in the context of a cellular system with an intended transmission source (e.g., the base station that is meant to communicate with a particular device) and one interfering source (e.g., a different base station or another source generating interference signals). It should be understood, however, that this disclosure is applicable to any number of interfering sources in any multi-transmission source system (e.g., WiMAX, WiFi BLUETOOTH or 3GPP LTE).

Figure 1:
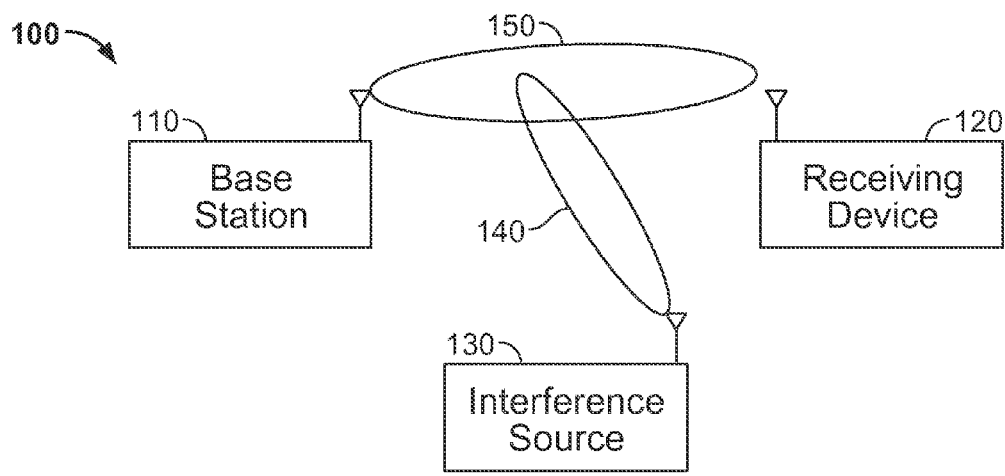
FIG. 1 is a diagram of wireless communication system in accordance with an embodiment of the present disclosure.

FIG. 1 is a diagram of a wireless communication system 100 in accordance with an embodiment of the present disclosure. System 100 includes a transmission source 110, a receiving device 120 and an interference source 130. Transmission source 110 may be a base station in a cellular environment that provides and receives data to/from receiving device 120.

Transmission source 110 may transmit broadcast signals to receiving device 120. The broadcast signals may include synchronization signals, system information, preamble, channel estimation assistance data, pilot information, and any other suitable broadcast control information. The broadcast signals may include implicitly or explicitly an identifier unique to transmission source 110 that allows receiving device 120 to identify signals transmitted by transmission source 110. The unique identifier may be referred to as cell ID, for example, in 3GPP LTE, or a MAC address, for example, in WiFi. This disclosure is discussed in connection with a 3GPP LTE system however the teachings apply similarly to any other wireless system. The broadcast signals may also include Physical Broadcast Channel (PBCH) information, Physical Control Format Indicator Channel information (PCFICH), Physical Downlink Shared Channel information (PDSCH), and/or Physical Downlink Control Channel information (PDCCH). The broadcast signals may also include cell specific reference signals (CRS) for channel estimation, and primary and secondary synchronization signals. For purposes of this disclosure, these broadcast signals may be referred to as pilot signals for simplicity and not limitation. The type of information included in the pilot signals may vary based on the type of wireless communication systems and may be used to enable receiving device 120 to connect to transmission source 110 and maintain synchronization with transmission source 110.

In some embodiments, the power of the pilot signals may be increased relative to the power of data signals transmitted by transmission source 110. Specifically, to ensure coverage and reliability, transmission source 110 may generate and transmit the pilot signals at a power level greater than the power level used to transmit the data signals. In some implementations, the pilot signals are transmitted by transmission source 110 periodically or randomly.

Interfering source 130 may be another base station, transmission source, noise, mobile device or any other source that transmits signals that overlap with the signals transmitted by transmission source 110. Interfering source 130 may generate a signal 140 that may overlap with signal 150 over some region. Interference source 130 may transmit similar pilot signals a transmission source 110 if interference source 130 is in the same type of wireless communication system as transmission source 110. Interference source 130 may transmit different types of pilot signals if the type of wireless communication system is different from transmission source 110. The pilot signals of interference source 130 may differ from the pilot signals of transmission source 110 at least in the unique identifier. Given the fact that transmission source 110 and interfering source 130 may be associated with different unique identifiers, the pilot signals (for example, CRS) may be different for transmission source 110 and interfering source 130. Specifically, transmission source 110 may transmit pilot signals that include a first CRS along with other broadcast information and interference source 130 may transmit pilot signals that include a second CRS (different from the first CRS) along with other broadcast information.

Similar to transmission source 110, interference source 130 may transmit the pilot signals with a greater amount of power than data signals. In some implementations, the pilot signals transmitted by interference source 130 may interfere with pilot signals transmitted by transmission source 110 and/or with data signals transmitted by transmission source 110. In such circumstances, the pilot signals transmitted by interference source 130 may be referred to as the known interference to the receiver. An exemplary implementation of pilot signals transmitted by transmission source 110 and pilot signals transmitted by interference source 130 is discussed in greater detail in connection with FIG. 2.

Although one interference source 130 is shown in FIG. 1, any number of interference sources may be present. Each interference source may generate interfering signals that may affect signal 150 intended by transmission source 110.

Receiving device 120 may be a cellular phone, PDA, mobile device, laptop, computing device, or any other suitable device used for communicating with a transmission source 110. Receiving device 120 may have one or more antennas for receiving signal 150 from transmission source 110. Depending on the location of receiving device 120, there may exist one or more interference sources 130 that transmit signals that interfere with the signals intended to be received by receiving device 120. For example, multiple base stations may generate signals that overlap a particular region in which a mobile device is situated. The mobile device may communicate with one of the base stations and the other base stations that have signals reaching the particular region may interfere with the signals of the base station with which the mobile device communicates.

Receiving device 120 may scan for signals from any transmission source (e.g., transmission source 110 and interference source 130) within a predetermined proximity of receiving device 120. For example, receiving device 120 may scan any signal received from a transmission source having a signal to noise or power ratio greater than a predetermined value. Receiving device 120 may process each signal receiving device 120 receives to detect pilot signals. Specifically, in cellular systems, the receiving device (e.g., the handset) may scan neighboring base stations as well as the serving base station to determine pilot signals associated with each base station.

Receiving device 120 may process the pilot signals received from each transmission source (e.g., transmission source 110 and interference source 130) to remove or mitigate interference from the intended signal. For example, receiving device 120 may process the pilot signals of the serving base station and the interfering base station to remove or mitigate interference caused by the interfering base station. After removing or mitigating interference from the received signals, receiving device 120 may utilize the interference free signal. The removal or mitigation of interference from a received signal using pilot signals is discussed in greater detail below in connection with FIG. 3.

Figure 2:
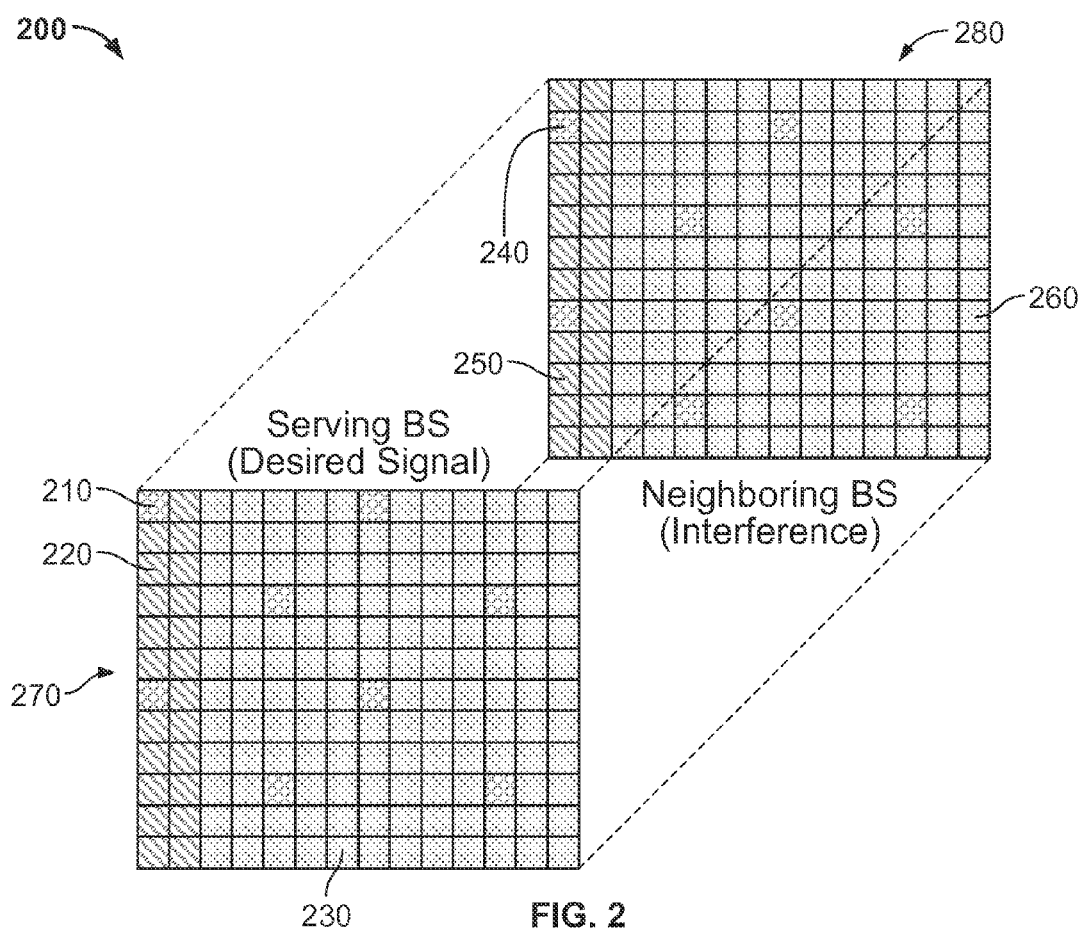
FIG. 2 is a diagram of illustrative information broadcast from transmission sources in accordance with an embodiment of the present disclosure.

FIG. 2 is a diagram 200 of illustrative information broadcast from transmission sources in accordance with an embodiment of the present disclosure. Diagram 200 shows signals 270, that may include pilot signals, from a serving base station (e.g., transmission source 110) and signals 280, that may include pilot signals, from a neighboring base station (e.g., interference source 130) in some implementations, the pilot signals from each base station may be similar or identical in length and configuration and may be transmitted at the same time. Specifically, the signals may include a first portion that includes control information (e.g., the pilot signals) and a second portion that includes data. The second portion may follow or precede the first portion. Each portion may include a plurality of frames and a plurality of sub-frames. Accordingly, receiving device 120 may be configured to determine which signals correspond to which base station based on the predetermined configuration and/or pilot signals.

As shown in diagram 200, each individual small box within the larger vertical box, representing the signals 270 and 280 for each base station, represents a given sub-frame within the frame (i.e., the vertical column of small boxes). The signals 270 and 280 may include any number of predetermined frames. Each frame in the signal may include a same predetermined number of sub-frames. Specifically, in LTE systems, each frame represents an OFDM symbol and each sub-frame represents a resource element (subcarrier) within the OFDM symbol.

In some embodiments, the first two frames of a given signal may include control information. The control information may include PDCCH values. The first two frames may also include pilot signals. The pilot signals may include a CRS value. The frames that follow the first two frames may include data (PDSCH) values and pilot signals (CRS) values.

Signals 270 from the serving base station may include a first portion with a first CRS sub-frame 210 and first PDCCH sub-frames 220 and signals 280 from the neighboring base station include a second portion with a second CRS sub-frame 240 and second. PDCCH sub-frames 250. The CRS sub-frame location within a given frame and CRS value may differ between the two signals (e.g., the CRS sub-frames between two pilot signals may be offset by one sub-frame location, and the CRS values in each CRS sub-frames may be different). Specifically, CRS sub-frame 210 location in the serving base station signal 270 may correspond to sub-frame positions 1 and 7 while CRS sub-frame 240 location in the neighboring base station signal 280 may correspond to sub-frame positions 2 and 8. Receiving device 120 may use the first portions of the sub-frames 210 and/or 240 to determine the known interference to the desired signal 270 since the information provided in the first portions includes predetermined information. Specifically, because the information included in the first portion has a predetermined arrangement, receiving device 120 may be able to detect the interference pattern. In the exemplary diagram 200, receiving device 120 may determine the interference between the serving base station signals 270 and the neighboring base station signals 280 to be in the sub-frame positions 2 and 8.

CRS sub-frames 210 and 240 may appear among a predetermined number of frames within the pilot signal (with the same or different values). For example, CRS sub-frame 210 may also appear among data frames 230 (e.g., PDSCH) of the data transmitted by the serving base station. Similarly, CRS sub-frame 240 may also appear among data frames 260 (e.g., PDSCH) of the data transmitted by the neighboring base station. The frame number that repeats the CRS sub-frame 210 or 240 may be the same between the two different signals 270 and 280. As such, receiving device 120 may be programmed to identify the CRS sub-frames in a particular frame in order to determine the CRS sub-frame value.

In some implementations, receiving device 120 may process the received signals to identify which pilot signal is being transmitted from which base station. Specifically, receiving device 120 may be preprogrammed or have stored the CRS value of the serving base station. Accordingly, receiving device 120 may be able to distinguish signal 270 transmitted by the serving base station from signals 280 transmitted by a neighboring base station. In response to detecting a pilot signal from a neighboring base station, receiving device 120 may store in a memory an association of each pilot signal with the corresponding base station.

Figure 3:
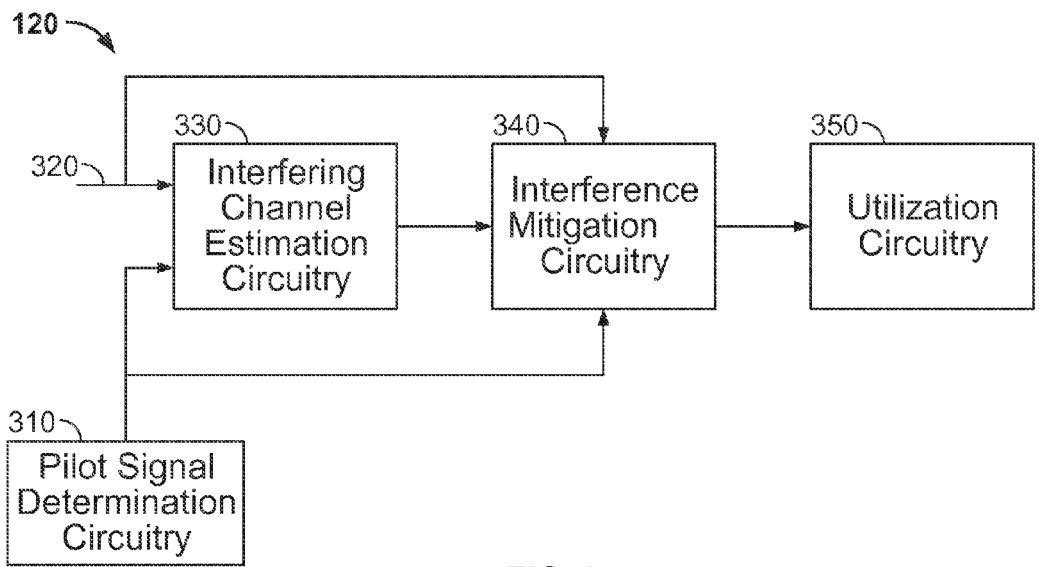
FIG. 3 is a diagram of an illustrative receiving device in accordance with another embodiment of the present disclosure.

FIG. 3 is illustrative of this embodiment of receiving device 120 in accordance with the present invention. Receiving device 120 may include pilot signal determination circuitry 310, interfering channel estimation circuitry 330, interference mitigation circuitry 340 and utilization circuitry 350.

Pilot signal determination circuitry 310 may process signals received by receiving device 120 to identify pilot signals. Specifically, pilot signal determination circuitry 310 may process the received sum of signals 140 and 150 to identify pilot signals. Pilot signal determination circuitry 310 may perform a process discussed above in connection with FIG. 2 to identify and extract pilot signals associated with various transmission sources. Pilot signal determination circuitry 310 may include a storage device in which an association between pilot signals and transmission sources is stored. Specifically, pilot signal determination circuitry 310 may store a representation of the pilot signal received from transmission source 110 (e.g., the received CRS information) and associate that representation with transmission source 110. Pilot signal determination circuitry 310 may store a representation of the pilot signal received from interference source 130 (e.g., the received CRS information) and associate that representation with interference source 130.

In some embodiments, pilot signal determination circuitry 310 generates the pilot signals (e.g., CRS) from each transmission source using the unique identifier of the transmission source. In some embodiments, pilot signal determination circuitry 310 receives the pilot signals (e.g. synchronization signals, PBCH) from each transmission source during scanning and generates and stores the pilot signals it receives as the pilot signal determined. In some embodiments, pilot signal determination circuitry 310 decodes the pilot signals after some other pilot signals become available from the same transmission source (e.g., decoding PDCCH after CRS is available and channel estimation is done) to generate the pilot signals. In some embodiments, pilot signal determination circuitry 310 receives assistance data from the system (e.g., another transmission source or pre-stored configuration data) that includes the information necessary to generate the pilot signals.

In some implementations, after identifying pilot signals from interfering source 130, pilot signal determination circuitry 310 may continue to determine whether to continue known interference mitigation. In such circumstances, pilot signal determination circuitry 310 may judge the benefit and reliability of known interference mitigation, based on some measurement of quality of identified pilot signals (e.g., based on whether a quality metric associated with identified pilot signals exceeds a threshold value). For example, pilot signal determination circuitry 310 may measure the strength of the desired signals with that of the known interference caused by the interfering pilot signals. When the relative strength, or signal-to-interference-ratio (SIR) is larger than some threshold or some adaptive rules, the benefit of mitigating a weak interference over the risk of inaccuracy introduced from the unreliable estimate of the known interference is small. Accordingly, pilot signal determination circuitry 310 may decide to bypass interference mitigation circuitry 340.

In some embodiments, receiving device 120 may mitigate known interference using a coherent interference cancellation technique. Interfering channel estimation circuitry 330 may process the received signals 320 (which may be the signal received by receiving device 120) and the pilot signals from the interfering source 130 to estimate the interfering channel associated with interference source 130. In particular, the desired (or transmission source 110) channel and the interfering (interference source 130) channel may be jointly or individually estimated when the interfering signals 140 occupy the same frequency and/or time resources as the pilot signals associated with transmission source 110. In such circumstances where joint channel estimation is implemented, received signals 320 may be supplied to interfering channel estimation circuitry 330 along with pilot signals associated with interference source 130 and transmission source 110. The pilot signals may be output by pilot signal determination circuitry 310 to interfering channel estimation circuitry 330. The pilot signals associated with interference source 130 and transmission source 110 may be processed together (or combined) with received signals 320 to compute a channel estimate for interference source 130. In such circumstances, various techniques of joint processing can be applied. For example, the received signals may be interpreted as the sum of the channels between each transmission source and the receiver multiplied by the pilot signals. A least square solution of both channels may be used to improve the channel estimation accuracy. Alternatively or in addition, a two dimensional filter may be used to filter the received signals, which is derived based on the pilot signals associated with the transmission source and the interference source.

The channel estimate for interference source 130 may be provided to interference mitigation circuitry 340. Interference mitigation circuitry 340 may also receive received signals 320 and pilot signals associated with, interference source 130. Interference mitigation circuitry 340 may generate the received interfering signals by the outcome of the pilot signals from interference source 130 traveling through the interfering channel. The received interfering signal may correspond to the portion of received signals contributed by the pilot signals from interference source 130. Interference mitigation circuitry 340 may subtract out the received interfering signals from the received signals 320 to generate interference free received signals for output to utilization circuitry 350.

In some embodiments, receiving device 120 may mitigate known interference using a coherent interference suppression technique. In such circumstances, interference mitigation circuitry 340 may perform an interference rejection combining/whitening process to generate an interference whitened received signal instead of or in addition to cancelling out the interference. Specifically, the interference correlation matrix can be determined from the interfering channels estimated by interfering channel estimation circuitry 330, and/or the expectation of the pilot signals from interference source 130. For example, an interference rejection filter, or a square root matrix of the inverted interference correlation matrix, may be used to whiten the received signal 320 and the desired channel. Other interference suppression filters may be implemented after the interference correlation matrix is determined. In such circumstance, the interference may be suppressed without cancelling each individual received signal.

The desired signal transmitted by transmission source 110 may then be computed using the interference free received signals. Alternatively or in addition, a channel estimate associated with transmission source 110 may be computed based on the interference free received signals.

In some embodiments, receiving device 120 may mitigate known interference using a non-coherent interference mitigation technique. In particular, receiving device 120 may mitigate known interference when transmission source 110 and/or interference source 130 transmit signals asynchronously. Specifically, receiving device 120 may mitigate interference in accordance with the following equation:

$$y(i)=h_1 s_1(i)+h_2 s_2(i)+n(i) \quad (1)$$

where y(i) is the received signal, $h_1(i)$ is the channel associated with the transmission source 110, $h_2(i)$ is the channel associated with interference source 130, $s_1(i)$ is a transmitted signal from transmission source 110, $s_2(i)$ is a transmitted pilot signal from interference source 130, T is a time/frequency, and i is a time/frequency index.

In some implementations, receiving device 120 may mitigate interference by simplifying equation (1) and mitigate interference in accordance with the following equation:

$$\{\hat{s}_1(1) \ldots \hat{s}_1(T)\} = \underset{s_1(i)\in\Omega}{\mathrm{argmax}} \left| \frac{1}{T} \sum_{i=1}^{T} (y(i) - h_1 s_1(i)) s_2^*(i) \right|^2 \quad (2)$$

where y(i) is the received signal, $h_1(i)$ is the channel associated with the transmission source 110, $s_1(i)$ is a transmitted signal from transmission source 110, $s_2(i)$ is a transmitted pilot signal from interference source 130, T is a time/frequency, and i is a time/frequency index. Mitigating non-coherent interference in accordance with equation (2) may avoid the need to compute channel estimates for interference source 130. Specifically, in the case of mitigating non-coherent interference, receiving device 120 may omit or avoid using interfering channel estimation circuitry 330 and may instead output the results of equation (2) directly to interference mitigation circuitry 340 and/or utilization circuitry 350.

Utilization circuitry 350 may include various analog or digital processing circuitries. For example, utilization may be a digital signal processor or a microprocessor or central processing unit (CPU). In some implementations, utilization circuitry 250 may include transmitter/receiver circuitry. In some embodiments, utilization circuitry 350 may provide control signals to any one of the components of system 100 to execute, change or modify the encoding/decoding, storing and retrieving memory operations. Utilization circuitry 350 may provide or receive user or system data to/from any one of the components of system 200 to identify pilot signals and/or cancel interference. Utilization circuitry 350 may include a channel estimation circuitry for computing a channel estimate associated with transmission source 110 (FIG. 1), signal demodulation circuitry, synchronization circuitry and/or radio measurement circuitry. Any of the circuitries included in utilization circuitry 350 may be coupled in parallel or in series to each other. For example, each component in utilization circuitry 350 may receive the signal output by interference mitigation circuitry 340. In some implementations, a signal output by channel estimation circuitry in utilization circuitry 350 may be output and processed by signal demodulation circuitry included in utilization circuitry 350.

Synchronization circuitry may include components to ensure receiving device 120 remains in synch with transmission source 110. In some implementations, the synchronization circuitry may utilize information contained in the pilot signal to maintain synchronization between receiving device 120 and transmission source 110. Radio measurement circuitry may include any suitable component for measuring signal-to-noise ratio or power ratio in received signal 150.

Figure 4:
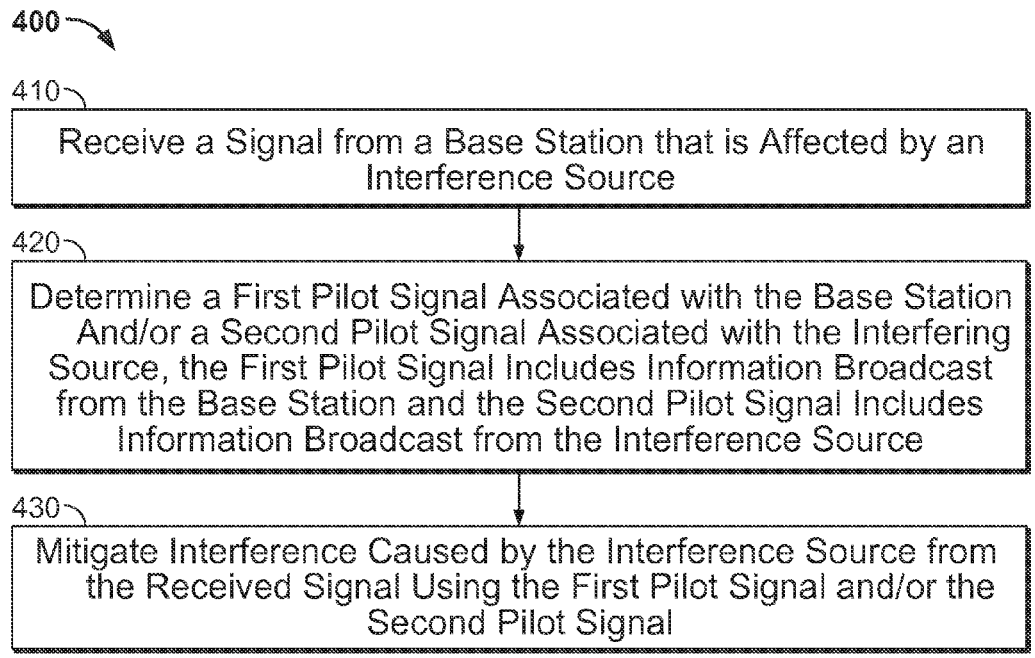
FIG. 4 illustrates a process for mitigating known interference with a receiving device in accordance with an embodiment of the present disclosure.

FIG. 4 illustrates a process 400 for mitigating known interference with a receiving device in accordance with an embodiment of the present disclosure. At 410, a signal affected by an interference source is received from a base station. For example, signal 150 may be received from transmission source 110. Signal 150 may be affected by signal 140 from interference source 130.

At 420, a first pilot signal associated with the base station and/or a second pilot signal associated with the interfering source are determined. In some implementations, where joint channel estimate and interference mitigation is not used, only a pilot signal associated with the interfering source may be determined instead of determining pilot signals for both the base station and the interfering source. The first pilot signal includes information broadcast from the base station and the second pilot signal includes information broadcast from the interference source. For example, pilot signal determination circuitry 310 may compute pilot signals associated with transmission source 110 and/or interference source 130 (e.g., in accordance with the FIG. 2 techniques). In some implementations, where joint channel estimate and interference mitigation is not used, only a pilot signal associated with the interfering source may be computed by pilot signal determination circuitry 310.

At 430, interference caused by the interference source is mitigated from the received signal using the first pilot signal and/or the second pilot signal. For example, interference mitigation circuitry 340 may remove, suppress or mitigate interference using the pilot signals associated with transmission source 110 and/or interference source 130. In some embodiment, interference may be removed or mitigated in accordance with equation (2).

It should be understood that the methods and apparatus discussed for mitigating known interference is described for the case of one interfering source, but the methods and apparatus are equally applicable to any number of interfering sources. Known interference from more than one interfering sources may be mitigated jointly or successively. In some implementation, known interference from a first interfering source may be mitigated at a time, and known interference from a second interfering source may be mitigated successively. In some implementation, known interference from more than one interfering sources may be jointly mitigated at the same time. Alternatively or in addition, the joint and successive known interference mitigation can be combined by grouping the interference sources and mitigating known interference from the groups. Each group may be assumed to be an interfering source, and known interference mitigation may be applied in a joint or successive fashion among groups, and within each groups among interfering sources as well.

The foregoing describes methods and apparatus for mitigating known interference. The above described embodiments of the present disclosure are presented for the purposes of illustration and not of limitation. Furthermore, the present disclosure is not limited to a particular implementation. For example, one or more steps of methods described above may be performed in a different order (or concurrently) and still achieve desirable results. In addition, the disclosure may be implemented in hardware, such as on an application specific integrated circuit (ASIC) or on a field-programmable gate array (FPGA). The disclosure may also be implemented in software.

What is claimed is:

1. A method for mitigating interference in a receiving device, the method comprising:
   receiving a signal from a transmission source that is affected by interference from an interference source;
   determining a first channel estimate corresponding to the transmission source;
   determining, based on the first channel estimate, an expected improvement to be achieved in signal quality resulting from performing an interference mitigation operation; and
   mitigating the interference caused by the interference source if the expected improvement to be achieved in signal quality exceeds a threshold, by finding a transmitted signal candidate that maximizes an average power of interference calculated based on the received signal and the first channel estimate, without using a second channel estimate corresponding to the interference source.

2. The method of claim 1, wherein mitigating the interference comprises:
   generating a representation of the interference from the interference source based on assistance information.

3. The method of claim 1, wherein mitigating the interference comprises:
   applying a non-coherent interference cancellation technique to the received signal to mitigate the interference from the interference source.

4. The method of claim 1, wherein assistance information is received from at least one of the transmission source and the interference source.

5. The method of claim 1, wherein assistance information comprises an identifier of the interference source.

6. The method of claim 1, wherein determining the expected improvement in signal quality comprises:
   comparing a strength of the signal from the transmission source with a strength of the interference from the interference source.

7. The method of claim 1, wherein the interference from the interference source corresponds to at least one of a Cell-Specific Reference Signal (CRS), a synchronization signal, a Physical Downlink Control Channel (PDCCH), or a Physical Control Format Indicator Channel (PCFICH).

8. The method of claim 1, wherein mitigating the interference caused by the interference source comprises determining a transmitted signal candidate from a set of transmitted signal candidates as a transmitted signal based on an optimization technique.

9. The method of claim 8, wherein the optimization technique comprises identifying the transmitted signal candidate that maximizes an average power of the interference calculated over a period of time based on an estimate of the interference, and wherein the estimate of the interference is based on the received signal, the first channel estimate, and the transmitted signal candidate.

10. A system for mitigating interference, the system comprising:
    a receiver configured to receive a signal from a transmission source that is affected by interference from an interference source;
    channel estimation circuitry configured to determine a first channel estimate corresponding to the transmission source;
    control circuitry configured to determine, based on the first channel estimate, an expected improvement to be achieved in signal quality resulting from performing an interference mitigation operation; and
    interference mitigation circuitry configured to mitigate the interference caused by the interference source if the expected improvement to be achieved in signal quality exceeds a threshold, by finding a transmitted signal candidate that maximizes an average power of interference calculated based on the received signal and the first channel estimate, without using a second channel estimate corresponding to the interference source.

11. The system of claim 10, wherein the interference mitigation circuitry is further configured to:
    generate a representation of the interference from the interference source based on assistance information.

12. The system of claim 10, wherein the interference mitigation circuitry is further configured to:
    apply a non-coherent interference cancellation technique to the received signal to mitigate the interference from the interference source.

13. The system of claim 10, wherein assistance information is received from at least one of the transmission source and the interference source.

14. The system of claim 10, wherein assistance information comprises an identifier of the interference source.

15. The system of claim 10, wherein the control circuitry is further configured to:
    compare a strength of the signal from the transmission source with a strength of the interference from the interference source.

16. The system of claim 10, wherein the interference from the interference source corresponds to at least one of a Cell-Specific Reference Signal (CRS), a synchronization signal, a Physical Downlink Control Channel (PDCCH), or a Physical Control Format Indicator Channel (PCFICH).

17. The system of claim 10, wherein interference mitigation circuitry is configured to determine a transmitted signal candidate from a set of transmitted signal candidates as a transmitted signal based on an optimization technique.

18. The system of claim 17, wherein the optimization technique comprises identifying the transmitted signal candidate that maximizes an average power of the interference calculated over a period of time based on an estimate of the interference, and wherein the estimate of the interference is based on the received signal, the first channel estimate, and the transmitted signal candidate.

* * * * *